July 29, 1941.　　　D. G. SMELLIE　　　2,250,971
REFRIGERATION
Filed July 20, 1938　　　3 Sheets-Sheet 2

INVENTOR
Donald G. Smellie
BY
ATTORNEY

July 29, 1941.                D. G. SMELLIE                 2,250,971
                                REFRIGERATION
                             Filed July 20, 1938           3 Sheets-Sheet 3

INVENTOR
Donald G. Smellie
BY Harry S. Demare
ATTORNEY

Patented July 29, 1941

2,250,971

UNITED STATES PATENT OFFICE 2,250,971

REFRIGERATION

Donald G. Smellie, Canton, Ohio, assignor to The Hoover Company, North Canton, Ohio, a corporation of Ohio Application July 20, 1938, Serial No. 220,202

27 Claims. (Cl. 62—5)

This invention relates to the art of refrigeration and more particularly to a novel absorption refrigerating system which simultaneously refrigerates a food storage compartment and produces ice blocks from a body of water.

According to the invention there is provided an absorption refrigerating system having an evaporator in heat exchange relationship with a body of water at a plurality of points and means are arranged to divert liquid refrigerant selectively from a condenser into different portions of said evaporator in order to freeze ice in different portions of the water tank. The diversion of the liquid refrigerant is accomplished by a thermal responsive means which is arranged to govern the size of the ice blocks formed in different portions of the water tank and which operates to divert the liquid refrigerant within the system without the interposition of any moving parts within the system and without passing any connecting or operating elements through the walls thereof.

More specifically, the invention provides a refrigerating system including a pair of evaporator conduits which are in thermal contact with a water tank and which include air-cooling fins along the length thereof. Refrigeration is alternately produced in the evaporator conduits and air from within the refrigerating compartment is permitted to flow across the inoperative evaporator conduit whereby the air is cooled by heat absorption from the previously cooled evaporator conduit, by heat abstracted from the ice blocks within the water tank which are melting free from the walls thereof, and by contact with the walls of the water tank. This construction provides a very large air-cooling area which operates at a relatively high temperature with the result that the air within the refrigerating compartment is cooled to the desired degree but the humidity thereof is not unduly lowered by reason of the fact that the air does not come in contact with any extremely low temperature surfaces.

In addition to the above objects, the present invention provides a mechanism in which the liquid diversion mechanism also functions as an efficient pre-cooler for the liquid refrigerant whereby no substantial portion of the refrigerating capacity thereof is utilized to lower the temperature of the liquid to temperatures prevailing within the evaporator.

It is a further object of the invention to provide a refrigerating system in which the liquid refrigerant enroute to certain portions of the evaporator pass in heat exchange relationship with other portions of the evaporator to be cooled and to accelerate ice melting which is occurring in heat exchange relationship with such other evaporator portions.

It is a further object of the invention to provide a refrigerating system including certain deformable elements which are deformed by a control mechanism entirely outside the system to control the path of flow of fluid within the system. In addition, the deformable elements of the system are arranged to serve as liquid cooling elements.

Other objects and advantages of the invention will become apparent as the description proceeds when taken in connection with the accompanying drawings in which.

The present invention has been illustrated as the same is applied to a three-fluid absorption system, but it is not limited thereto and may be embodied in other forms of refrigerating systems.

Figure 1:
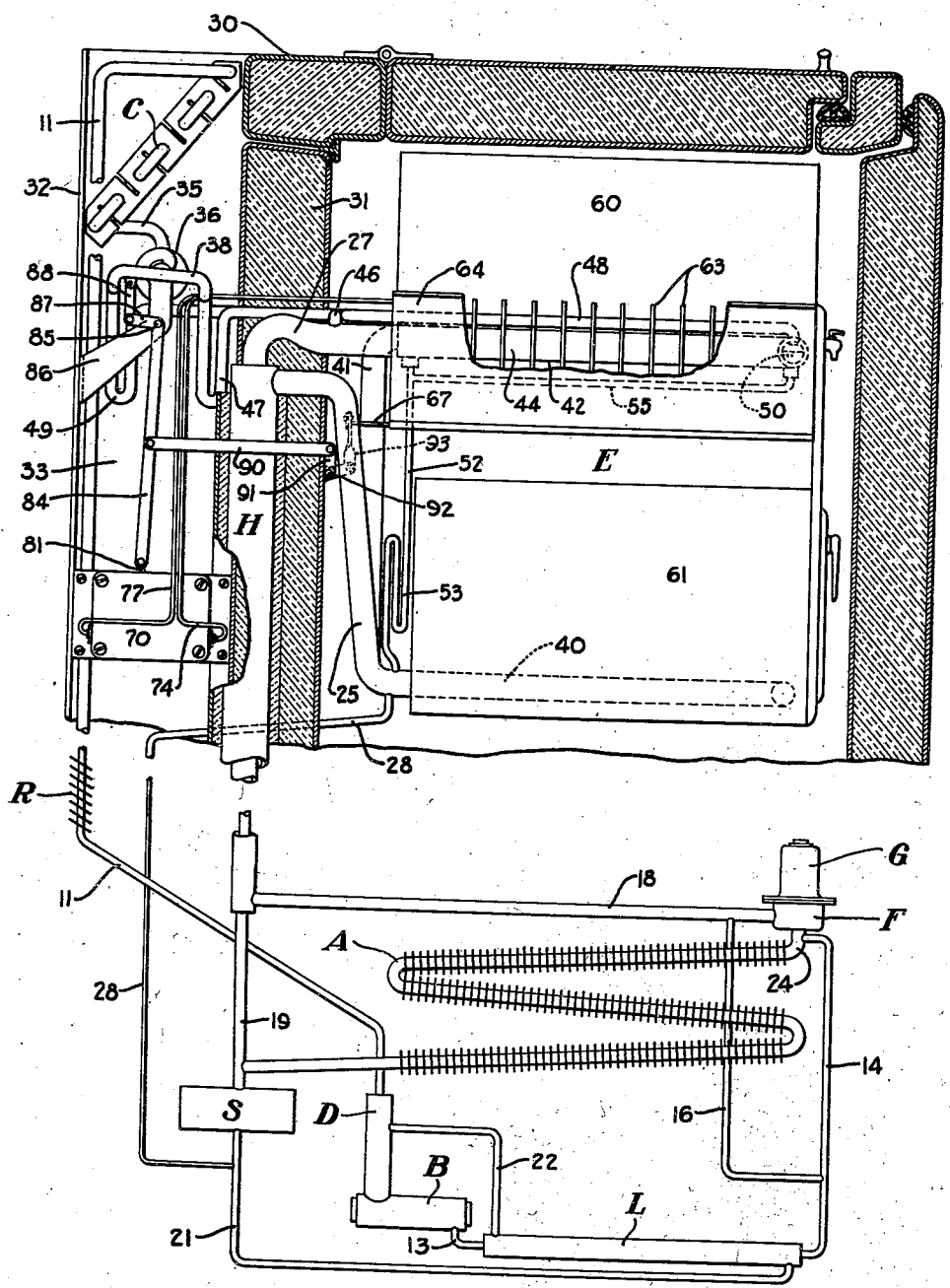
Figure 1 illustrates a refrigerating system to which the invention is applied and the arrangement of portions of the system in a cabinet.

Referring now to the drawings, and particularly to Figure 1 thereof, the refrigerating system comprises a boiler B, an analyzer D, an air-cooled rectifier R, an air-cooled condenser C, an evaporator E, a gas heat exchanger H, a tubular air-cooled absorber A, a solution reservoir S, a liquid heat exchanger L, and a circulating fan F which is driven by an electrical motor G. The above described elements are connected by a plurality of conduits to form a complete refrigerating system including a number of gas and liquid circuits to which reference will be made in more detail hereinafter.

The above described refrigerating system will be charged with a suitable refrigerant, such as ammonia, a suitable absorbent, such as water, and a suitable inert pressure equalizing medium, such as nitrogen.

The boiler B may be heated in any suitable manner as by a gas burner or an electrical cartridge heater. The circulating motor G and the heater for the burner may be controlled in any suitable or desired manner in order to maintain the refrigerating system within the desired temperature limits.

The application of heat to the boiler B liberates refrigerant vapor from the refrigerant absorption solution therein contained. The refrigerant vapor so liberated passes upwardly through the analyzer D in counterflow relationship to strong solution flowing downwardly therethrough. Further refrigerant vapor is generated in the analyzer, the heat of vaporization being supplied by the heat of condensation of absorption solution vapor which finds its way from the boiler into the analyzer. The refrigerant vapor is conducted from the upper portion of the analyzer D to the upper portion of the tubular air-cooled condenser C by a conduit 11 which includes the air-cooled rectifier R. The rectifier causes condensation of any vapor of absorption solution which may pass through the analyzer. In the condenser C the refrigerant vapor is liquefied by heat exchange with cooling air and is discharged from the condenser into a diversion mechanism to be described more fully hereinafter.

The weak solution formed in the boiler is conveyed therefrom through the conduit 13, the liquid heat exchanger L, and the conduit 14 to the upper portion of the inclined absorber A. It is apparent that the upper portion of the absorber is above the liquid level normally prevailing in the boiler-analyzer system wherefore some means must be utilized in order to elevate the liquid upwardly to the absorber. For this purpose a small bleed conduit 16 is connected between the discharge conduit 18 of the circulating fan F and the conduit 14 below the liquid level normally prevailing in the boiler-analyzer system, whereby the weak solution is elevated into the absorber by gas lift action. In the absorber the weak solution flows downwardly in counterflow relationship to an inert gas pressure equalizing medium flowing upwardly therethrough. The absorption solution absorbs the refrigerant vapor content of the mixture and the heat of absorption is rejected to the air flowing over the exterior of the absorber by the fins attached thereto. Strong solution is formed in the absorber by the absorption of refrigerant vapor. The strong solution is discharged into the bottom portion of a rich gas conduit 19 which communicates with the bottom portion of the absorber and opens into the solution reservoir S. From the solution reservoir S the rich solution is conveyed by a conduit 21, the liquid heat exchanger L, and a conduit 22 into the upper portion of the analyzer D, thus completing the absorption solution circuit.

The lean pressure equalizing medium formed in the absorber is conveyed from the upper end thereof to the suction inlet of the circulating fan F by a conduit 24. The inert gas is placed under pressure by the circulating fan and is conveyed through the conduit 18, the outer path of the gas heat exchanger H and a conduit 25 into the bottom portion of the evaporator E which will be described more fully hereinafter. For the present it is sufficient to note that the pressure equalizing medium flows through the evaporator in which it is brought into contact with liquid refrigerant discharged from the condenser. The liquid refrigerant evaporates into the pressure equalizing medium to produce refrigeration and the resulting rich mixture of pressure equalizing medium and refrigerant vapor is conveyed from the upper end of the evaporator through a conduit 27 into the gas heat exchanger H from which the rich gas is conveyed through the conduit 19 to the bottom portion of the absorber A. The rich mixture flows upwardly through the absorber A in counterflow relationship to the absorption solution in the manner described heretofore.

The evaporator is drained by a conduit 28 which connects the gas inlet portion of the coil 40 with the strong solution conduit 21. In Figure 1 only a part of the apparatus has been shown mounted in a refrigerant cabinet. It is to be understood that the remainder of the apparatus will be housed in any desired manner.

The cabinet 30 includes a removable window element 31 in the rear wall thereof. A panel 32 is suitably spaced from the rear wall of the cabinet 30 to form therewith an air-cooling flue 33 in the upper portion of which the condenser C is mounted. The gas heat exchanger H is partially embedded in the rear wall of the cabinet 30 and in the removable window element 31. The inert gas conduits 25 and 27 pass through the inner wall of the window 31 to join the evaporator E.

Figure 3:
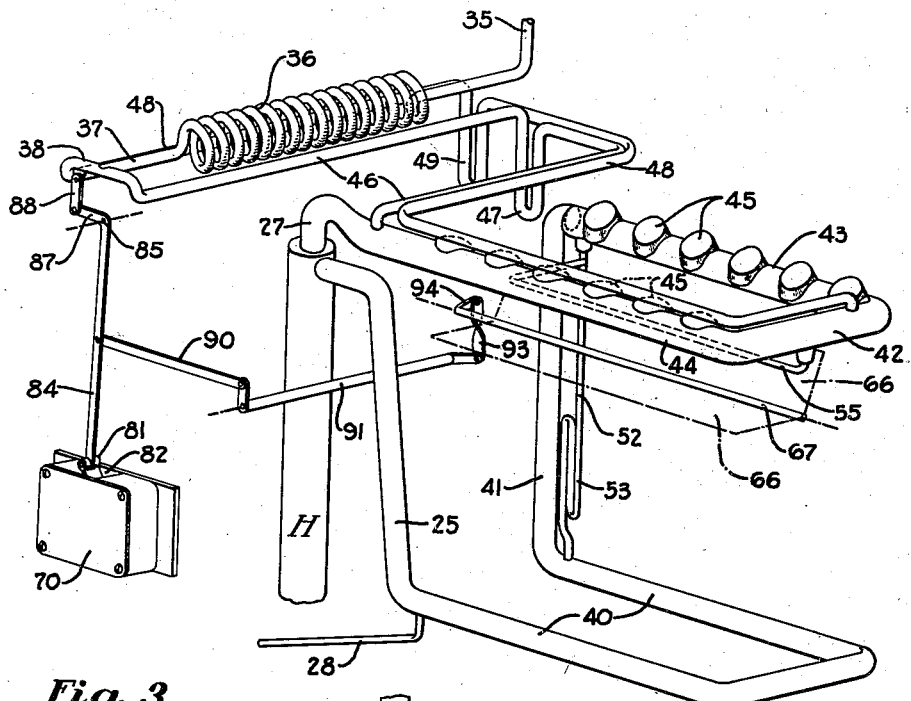
Figure 3 is a perspective view of the evaporator and liquid supply coil structure.

Referring now to Figure 3, the evaporator conduit and the liquid supply mechanism therefor will be described. The liquid refrigerant formed in the condenser is discharged therefrom through a conduit 35 into a helically wound conduit 36 which terminates in an elongated conduit 37. A short horizontal diversion conduit 38 is carried by the conduit 37 which opens into its central portion.

The evaporator conduit comprises a lower U-shaped fast-freezing compartment cooling coil 40 which communicates at one end with the lean gas conduit 25 and at its other end with a riser conduit 41 which communicates with one end of a U-shaped ice freezing evaporator coil 42. The opposite end of the coil 42 communicates with the rich gas discharge conduit 27. The U-shaped coil 42 includes two parallel conduits 43 and 44 each of which is provided with a plurality of upstanding heat transfer plugs 45.

Figure 2:
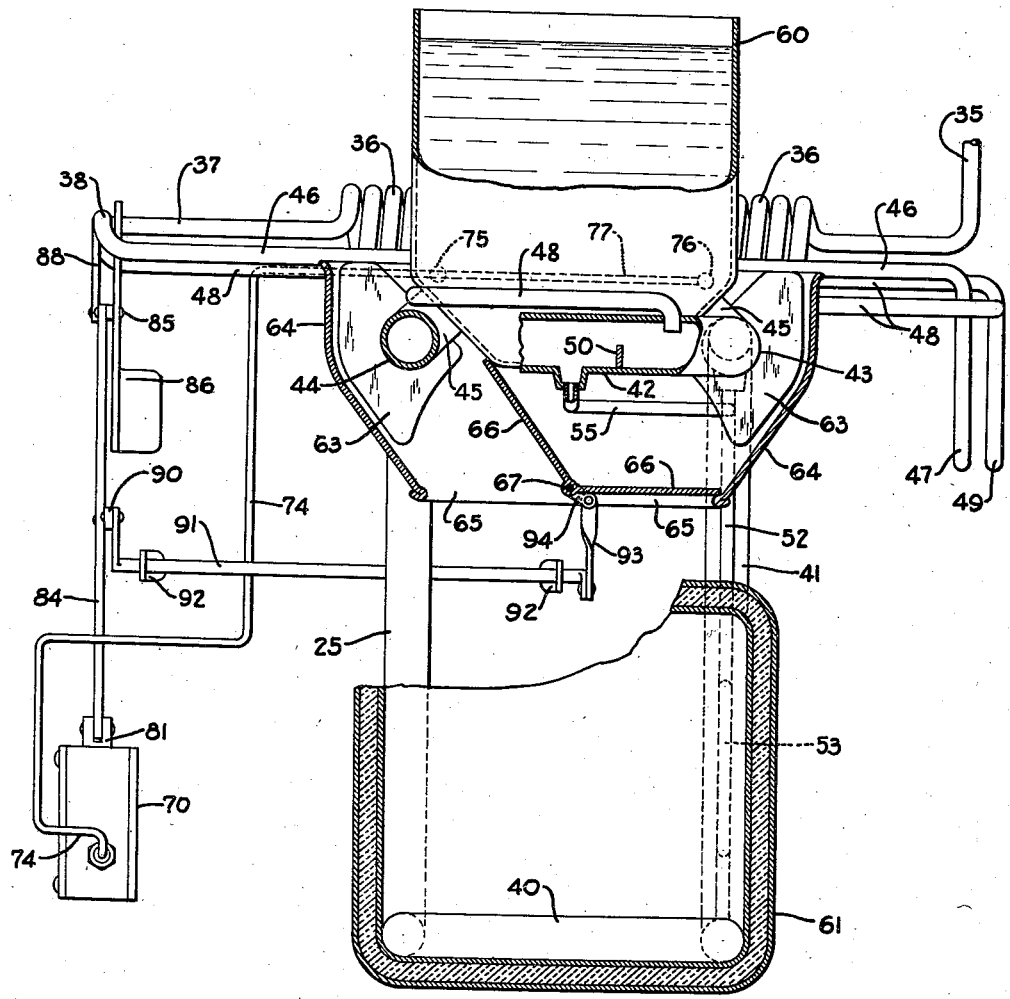
Figure 2 is a fragmentary elevational view, partially in section, of the evaporator.

One side of the liquid refrigerant diversion element 38 communicates with the conduit section 44 of the ice-freezing coil 42 through a conduit 46 which includes a U-shaped liquid seal 47. The other side of the diversion element 38 communicates through a conduit 48, which includes a U-shaped liquid seal 49, with the other side of the U-shaped coil 42. The conduit 46 communicates directly with the gas discharge end of the conduit 44, and the conduit 48 communicates with the gas discharge end of the conduit 43. The conduit 48 passes in heat exchange relationship to the freezing pads 45 formed on the conduit 44. A small liquid dam 50, see Figure 2, is formed in the conduit 42 on the gas discharge side of its connection with the conduit 48 to prevent liquid refrigerant discharging through the conduit 48 from flowing into the conduit 44. Any liquid refrigerant not evaporated in the conduit section 43 is drained therefrom into the gas outlet portion of the conduit 40 through a drain conduit 52 which includes a U-shaped seal 53. Any liquid not evaporated in the conduit 44 is drained therefrom into the drain 52 through a drain conduit 55.

Referring now to Figure 2, the evaporator is illustrated in connection with a water freezing tank 60 and an insulated fast-freezing chamber 61. The U-shaped coil 40 lies in the bottom portion of the chamber 61 and serves to refrigerate the same. The ice-freezing evaporator conduits 43 and 44 are positioned appreciably above the top portion of the chamber 61 and support the water tank 60 which has a tapered bottom portion resting upon the freezing pads 45. Each of the conduits 43 and 44 is provided with a plurality of air-cooling fins 63 which are spaced slightly from the tapered bottom walls of the tank 60. A shroud 64 encases the fins 63 except for horizontal top openings adjacent the lower side walls of the tank 60. The bottom portion of the shroud 64 is provided with an air inlet opening 65 in which a V-shaped flap valve 66 is attached to a shaft 67 which is pivotally mounted in the shroud 64. The flap valve 66 is arranged to allow air flow over only one of the ice freezing conduits at a time. This results from the fact that one leg of the V-shaped valve 66 is always horizontal and is blocking one-half the opening 65 while the other half of the valve 66 extends upwardly at an angle which is substantially a continuation of the bottom portion of the tank 60 which it contacts. Therefore, free path of flow for cooling air is provided from the refrigerating compartment, over the chamber 61, through shroud opening 65, and through a path formed by the shroud and the bottom of the tank 60 over the fins 63 of the conduit 44.

In order to control the production of ice within the tank 60 a suitable control mechanism is provided which will now be described. A control casing 70 is mounted in the air flue 33 beneath the coil structure 36. This casing houses a pair of pressure sensitive bellows elements 71 and 72 which are rigidly fastened to opposite interior walls thereof. The bellows 72 communicates with the capillary tube 74 which terminates in a bulb element 75 which is positioned within the tank 60 in position to be frozen into one corner of an ice block freezing within the tank 60 in contact with one of the freezing pads 45 on the evaporator conduit element 44. The pressure sensitive bellows 71 communicates with the capillary tube 77 which terminates in a bulb element 76 which is positioned to be frozen into an ice block forming within the tank 60 above that portion thereof which is in contact with one of the pads 45 on the conduit element 43. The arrangement is such that when either of the bulbs 75 or 76 is frozen into an ice block formed within the tank 60, the associated bellows will collapse, whereas the bellows associated with each of the bulb elements 75 and 76 will be expanded when the bulb is not frozen into the ice blocks.

The casing 70 also houses a snap-acting mechanism 80 which is adapted to be actuated by the bellows 71 and 72. The snap-acting mechanism 80 is so arranged that it cannot be actuated by an expanding bellows element if the opposite bellows element is also expanded; under these circumstances, the snap-acting mechanism will be held in a nearly neutral position until the originally expanded bellows element eventually collapses. The snap-acting mechanism 80 includes an actuating arm 81 which extends through a slot 82 formed in the top wall of the casing 70. The actuating arm 81 pivotally connects to a leg 84 of a bell crank lever which is pivotally mounted at 85 on a bracket 86 which is suitably supported in any desired manner within the flue 33. The other leg 87 of the bell crank is pivotally connected to a link 88 which in turn is pivotally connected to one side of the diversion conduit 38. The leg 84 of the bell crank also is pivotally connected to a link 90 which extends through the window element 31 to the interior of the refrigerating compartment. The link 90 is pivotally connected to one leg of a bell crank 91 which is pivotally mounted at 92 on the rear wall of the cabinet 30 and on the interior thereof. The other leg of the bell crank 91 is pivotally connected to a twisted link 93 which is pivotally carried by a crank 94 on the shaft 67 of the flap valve 66. The arrangement is such that movement of the snap-acting mechanism by either of the bellows 71 or 72 over its center position snaps the flap valve 66 into one position or the other through the action of the links 81, 84, 90, 91, 93 and 94, and the diversion element 38 is tilted one way or the other by the snap-acting mechanism 80 through the action of the links 81, 84, 87 and 88. The mounting of the diversion conduit 38 on the helix 36 and the long tube connections 46 and 48 permit that conduit to be rocked about a transverse axis by a very small force in order to cause liquid refrigerant flowing through the conduit 37 to be diverted entirely to one side or the other of the conduit 38.

The operation of the invention will now be described. Assuming that the apparatus has not been operated and that there is no ice in the water in the tank 60, energization of the heater for the boiler B and the circulating motor G will cause liquid refrigerant to be produced and to flow into the coil 36. The liquid supplied to the coil 36 will be at a relatively high temperature but its temperature will be somewhat lowered while it is passing through that coil by the air in the flue 33 which flows thereover. Under these conditions, both bellows 71 and 72 will be expanded, but the control mechanism will be in one or the other of its two positions and will consequently have operated the diversion conduit 38 and the flap valve 66 to one or the other of the two positions assumed by these elements. Assuming, for purposes of explanation, that the control mechanism 70 is in the position shown in Figure 1, the diversion conduit 38 will be slanted downwardly from its point of connection with the conduit 48 to its point of connection with the conduit 46 whereby all liquid refrigerant supplied to the conduit 38 from the conduit 37 will be discharged through the conduit 46 into the gas outlet portion of the evaporator conduit 44. Under these conditions, the flap valve 66 will have been actuated by the control mechanism 70 to the position opposite to that shown in Figure 2 whereby to prevent flow of cooling air over the conduit 44 and to permit flow of air over the conduit 43. The liquid refrigerant will flow through the conduit 44 counter to the inert gas stream flowing therethrough and will evaporate to produce refrigeration in that conduit which will cause the formation of ice blocks in those portions of the tank 60 which are in contact with one of the freezing pads 45. Any refrigerant not evaporated in the conduit 44 is drained through the conduit 55, the conduit 52 and the liquid seal 53 into the conduit 40 through which the liquid flows counter to the inert gas stream to produce refrigeration in that conduit.

Figure 4:
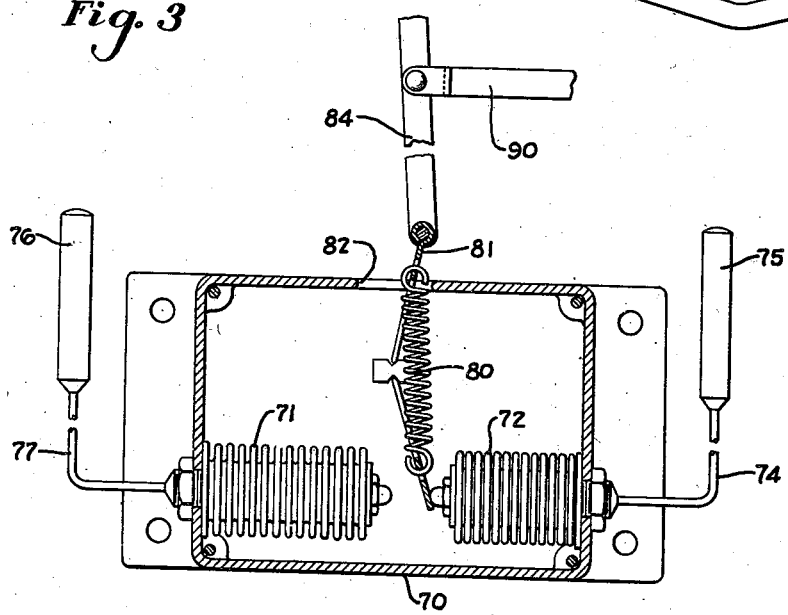
Figure 4 is a sectional elevational view of a control mechanism.

The above described operation continues until the ice blocks formed in that portion of the tank 60 in heat transfer relationship with the conduit 44 have reached a predetermined depth whereupon one of said ice blocks will contact the bulb 75 and will cause the bellows 72 to collapse. When this occurs, the snap-acting mechanism 80 will be actuated to the position shown in Figure 4 by the bellows 71 which in turn will actuate the diversion conduit 38 and the flap valve 66 to a new position in which the liquid refrigerant will be discharged from the conduit 38 into the conduit 48, the air flow will be directed over the fins 63 mounted on the conduit 44, and air will be prevented from flowing over the fins 63 mounted on the conduit 43. The liquid refrigerant now discharges into the conduit 48, passes therethrough in contact with the freezing pads 45 on the conduit 44 to give up heat to those pads thereby aiding the ice blocks in contact therewith to melt free of the bottom wall of the tank 60 in order that they float to the surface of the water therein contained to be readily available. The air in the refrigerating compartment now flows over the cold conduit 44, the fins 63 thereon and the exposed walls of the tank 60 thereby it is refrigerated. The liquid refrigerant discharged in the conduit 48 flows through the conduit 43 counter to the inert gas into which it evaporates to produce refrigeration which freezes ice blocks in those portions of the tank 60 in thermal relationship with the conduit 43. Any liquid refrigerant not evaporated in the conduit 43 is drained through the conduit 52 into the evaporator conduit 40 where further evaporation occurs.

In this way the refrigerator operates alternately to produce refrigeration in the conduits 43 and 44 to freeze ice blocks of a predetermined size in the bottom portion of the tank 60 and later to free such blocks from the walls of the tank 60 by heat exchange with the air in the refrigerating compartment. The air in the refrigerating compartment is continuously cooled by contact with one set or the other of the fins 63 and also by contact with the exterior walls of the tank 60 which are exposed to the air within the refrigerating compartment. Additionally, refrigeration is substantially continuously produced within the low temperature freezing compartment 61. Low temperature refrigeration in this compartment is secured by reason of the fact that the leanest inert gas is supplied thereto, though the quantity of refrigerant reaching the cooling coil 40 is relatively small. The small quantity of refrigerant does not prevent proper operation of the coil 40 because the temperature within the compartment 61 is normally lowered to a very low value at which it remains substantially continuous.

The temperature of the fins 63 is raised very quickly to a temperature above the melting point of ice, and the exterior walls of the tank 60 are at no time below the melting point of ice. Therefore, there is provided a very large area of high temperature air cooling surface which cools the refrigerating compartment but without lowering the humidity within that compartment below a value which will inhibit undesirable drying and crisping of foodstuffs stored in the refrigerating compartment.

The ice blocks formed within the tank 60 float to the surface of the water after they are freed from the bottom walls of the tank by heat supplied from the air within the refrigerating compartment and, in the case of the conduit 44, by heat supplied from the warm liquid refrigerant flowing through the conduit 48. The ice block may then be ladled from the tank 60 as needed.

The time required to free the ice blocks from the tank adjacent the conduits 43 and 44 is substantially constant. The conduit 44 receives some heat from the liquid supply conduit 48 but this is balanced by the fact that the conduit 44 receives cold gases from the operating conduit 43 during its ice melting period. If desired, the conduit could be passed in heat exchange relationship with the pads 45 on the conduit 43 before discharging into the conduit 44.

The above described cycle of operation continues as long as the temperature of the air within the refrigerating compartment remains above the minimum value for which the control mechanism is set. Therefore, the production of ice is directly related to the demand for refrigeration in the refrigerator storage compartment. By reason of this, the production of ice is automatically regulated to meet with the demand therefor. During periods of warm weather the load on the refrigerating compartment is increased whereby the apparatus operates for a greater percentage of time than it operates during cold weather and thereby produces more ice during warm weather which is desirable as that is the period of greatest ice demand.

If desired, a removable or a hinged cover may be provided for the tank 60. Access to the tank may be had from the front of the refrigerating chamber or through a suitable hinged door in the top wall of the cabinet, as illustrated.

The above described apparatus provides an absorption refrigerating system of the sealed high pressure type in which the locale of the refrigerating effect produced within the system is determined by external conditions evidencing refrigeration demand and is effected by selectively controlling the flow of liquid within the system without providing any moving parts within the system and without passing any operative elements through the walls of the system. Thus, complete and accurate control of the flow of the liquid refrigerant is assured without encountering any of the difficulties which would result from moving parts within or passing through the walls of the system.

While the invention has been described in detail, it is not limited to the precise construction or form described, but various changes may be made in the arrangement, construction and proportion of parts without departing from the spirit of the invention or the scope of the appended claims.

I claim:

1. Refrigerating apparatus comprising a cooling unit including a plurality of parts, a cooling medium supply means, and means for conveying the cooling medium selectively into a selected one of said plurality of parts, said conveying means including a deformable portion of said apparatus, and means for deforming said deformable portion of said apparatus to control the production of refrigeration.

2. Refrigerating apparatus comprising a cooling unit including a plurality of parts, a cooling medium supply means, means for conveying the cooling medium selectively into a selected one of said plurality of parts, said conveying means including a deformable element, and thermostatic means adapted to operate said deformable element to divert the cooling medium into a selected part of said cooling unit in response to refrigeration demand.

3. Refrigerating apparatus comprising a cooling unit including a plurality of parts, a cooling medium supply means, means for diverting the cooling medium selectively into a selected one of said plurality of parts, said diverting means including a deformable element, said deformable element comprising a horizontally positioned transverse conduit communicating at its ends with separate parts of said cooling unit, and a coiled supply conduit supporting said transverse conduit and connected to the central portion thereof.

4. Refrigerating apparatus comprising a cooling unit including a plurality of parts, a cooling medium supply means, and means for conveying the cooling medium selectively into a selected one of said plurality of parts, said conveying means including a deformable element, thermostatic means adapted to operate said deformable element to divert the cooling medium into a selected part of said cooling unit in response to refrigeration demand, air cooling fins mounted on a plurality of parts of said cooling unit, and means operated by said thermostatic means for preventing flow of cooling air over the air-cooling fins on those parts of said cooling unit which are receiving the cooling medium.

5. Refrigerating apparatus comprising a pair of spaced evaporator conduits, an insulated freezing chamber, an evaporating element in said freezing chamber, means for draining unevaporated liquid refrigerant from said evaporator conduits to said evaporating element, means for supplying liquid refrigerant selectively to said pair of evaporator conduits, a water tank in heat exchange relationship with said pair of evaporator conduits, said selecting means including a deformable element included in said liquid supply means, thermostatic means for deforming said deformable element to divert liquid refrigerant selectively into one or the other of said pair of evaporator conduits in heat exchange relationship with said water tank in response to the demand for refrigeration.

6. Refrigerating apparatus comprising a pair of spaced evaporator conduits, an insulated freezing chamber, an evaporating element in said freezing chamber, means for draining unevaporated liquid refrigerant from said evaporator conduits to said evaporating element, means for supplying liquid refrigerant selectively to said pair of evaporator conduits, a water tank in heat exchange relationship with said pair of evaporator conduits, said selecting means including a deformable element included in said liquid supply means, thermostatic means for deforming said deformable element to divert liquid refrigerant selectively into one or the other of said pair of evaporator conduits in heat exchange relationship with said water tank in response to the demand for refrigeration, a plurality of air-cooling fins mounted on each of said pair of evaporator conduits, means forming a shroud around said fins to form a pair of paths for cooling air thereover, and means controlled by said thermostatic means for directing the flow of air over a selected one of said evaporator conduits.

7. Absorption refrigerating apparatus including a pair of serially connected evaporating elements, a water tank mounted in heat exchange relationship with said evaporating elements, means for propelling a pressure equalizing medium through said evaporating elements, means for supplying liquid refrigerant to said evaporating elements including a deformable element, means connecting one end of said deformable element to the gas outlet portion of one of said serially connected evaporating elements, means connecting the other end of said deformable element to the gas outlet portion of the other of said evaporating elements, said last mentioned means being in heat exchange relationship with those portions of said one evaporating element which are in heat exchange relationship with said water tank, and thermostatic means for operating said deformable element for selectively diverting the refrigerant from one of said evaporating elements to the other thereof.

8. Refrigerating apparatus comprising a pair of evaporator conduits, a water tank mounted in heat exchange relationship with said conduits, means for supplying refrigerant liquid to said evaporator conduits, thermostatic means constructed and arranged to divert the liquid refrigerant entirely to one or the other of said evaporator conduits, said thermostatic means being operable to prevent shifting of supply of liquid refrigerant from one of said evaporator conduits to the other thereof until ice blocks have formed to a predetermined depth on the interior of said water tank in heat exchange relationship with the evaporator conduit which is receiving liquid refrigerant.

9. Refrigerating apparatus comprising a pair of evaporator conduits, a water tank mounted in heat exchange relationship with said conduits, means for supplying refrigerant liquid to said evaporator conduits, thermostatic means constructed and arranged to divert the liquid refrigerant entirely to one or the other of said evaporator conduits, said thermostatic means being operable to prevent shifting of supply of liquid refrigerant from one of said evaporator conduits to the other thereof until ice blocks have formed to a predetermined depth on the interior of that portion of said water tank in heat exchange relationship with and adjacent the evaporator conduit which is receiving liquid refrigerant, a plurality of air cooling fins on each of said evaporator conduits, means cooperating with said tank forming a pair of paths for cooling air across the fins on each of said evaporator conduits and across the bottom portion of said water tank, air flow control means operable to permit flow of cooling air through only one of said paths at a time, and means connecting said thermostatic means to said air flow control means to operate said air flow control means to permit flow of cooling air over the evaporator conduit which is not receiving liquid refrigerant.

10. A liquid diverter for high pressure sealed systems comprising a coiled conduit, a horizontally positioned diversion conduit, conduit means connecting one end of said coiled conduit and the mid-portion of said horizontally positioned diversion conduit, discharge conduits connected to each end of said horizontally positioned diversion conduit, and means connected to said horizontally positioned diversion conduit and operable to tilt the same about a horizontal axis which is transverse to the longitudinal axis thereof in order to divert liquid flowing through said coiled conduit into one or the other of said discharge conduits.

11. A liquid diverter for high pressure sealed systems comprising a coiled conduit, a horizontally positioned diversion conduit, conduit means connecting one end of said coiled conduit and the mid-portion of said horizontally positioned diversion conduit, discharge conduits connected to each end of said horizontally positioned diversion conduit, and means connected to said horizontally positioned diversion conduit and operable to tilt the same about a horizontal axis which is transverse to the longitudinal axis thereof in order to divert liquid flowing through said coiled conduit into one or the other of said discharge conduits, said discharge conduits including long horizontally positioned segments which may be deformed without materially straining the same.

12. An absorption refrigerating system comprising a solution circuit including a boiler and an absorber, a pressure equalizing medium circuit including said absorber and a plurality of evaporating elements, power driven circulating means in said pressure equalizing medium circuit, a gas lift circulator in said solution circuit, means for diverting a portion of the circulating pressure equalizing medium into said gas lift circulator, means for liquefying refrigerant vapor generated in said boiler, means for selectively diverting liquid refrigerant from said liquefying means into a selected evaporating element, a water tank mounted in heat transfer relationship with said evaporating elements, and thermostatic means for operating said diverting means, said thermostatic means being constructed and arranged to operate said diverting means to produce ice blocks of a predetermined size in a portion of said water tank in heat transfer relationship with a selected evaporating section and then to operate said diverting means to divert the liquid refrigerant to another selected evaporating section.

13. Absorption refrigerating apparatus comprising an inert gas circuit including an absorber and a plurality of evaporators, a solution circuit including a generator and said absorber, means for liquefying refrigerant vapor produced in said generator, and means for selectively directing the refrigerant liquid into a selected one of said evaporators.

14. Absorption refrigerating apparatus comprising an inert gas circuit including an absorber and a plurality of evaporators, a solution circuit including a generator and said absorber, means for liquefying refrigerant vapor produced in said generator, and thermostatic means responsive to the thermal condition of said evaporators for selectively directing the refrigerant liquid into a selected one of said evaporators.

15. Absorption refrigerating apparatus comprising an inert gas circuit including an absorber and a plurality of evaporators, a solution circuit including a generator and said absorber, means for liquefying refrigerant vapor produced in said generator, a water tank in heat transfer relationship with each of said evaporators, and means for selectively directing the refrigerant liquid into a selected one of said evaporators.

16. Absorption refrigerating apparatus comprising an inert gas circuit including an absorber and a plurality of evaporators, a solution circuit including a generator and said absorber, means for liquefying refrigerant vapor produced in said generator, a water tank in heat transfer relationship with each of said evaporators, means for selectively directing the refrigerant liquid into a selected one of said evaporators, and thermostatic means operably connected to said directing means to operate the same to direct liquid refrigerant successively into each of said evaporators until ice blocks of a predetermined size have been formed within those portions of the water tank in heat exchange relationship with the evaporator which is receiving refrigerant.

17. Absorption refrigerating apparatus comprising an inert gas circuit including an absorber and a plurality of evaporators, a solution circuit including a generator and said absorber, means for liquefying refrigerant vapor produced in said generator, a water tank in heat transfer relationship with each of said evaporators, means for selectively directing the refrigerant liquid into a selected one of said evaporators, thermostatic means operably connected to said directing means to operate the same to direct liquid refrigerant successively into each of said evaporators until ice blocks of a predetermined size have been formed within those portions of the water tank in heat exchange relationship with the evaporator which is receiving refrigerant, and thermostatic means for preventing the supply of refrigerant liquid to any of said evaporators until ice blocks previously frozen thereby have melted free of the walls of said tank.

18. Absorption refrigerating apparatus comprising an inert gas circuit including an absorber and a plurality of evaporators, a solution circuit including a generator and said absorber, means for liquefying refrigerant vapor produced in said generator, means for selectively directing the refrigerant liquid into a selected one of said evaporators, means defining a plurality of air flow paths each of which includes one of said evaporators, and means for controlling such air flow paths to prevent flow of air over any evaporator except one to which the supply of refrigerant liquid has just been discontinued.

19. Absorption refrigerating apparatus comprising an inert gas circuit including an absorber and a plurality of evaporators, a solution circuit including a generator and said absorber, means for liquefying refrigerant vapor produced in said generator, means for selectively directing the refrigerant liquid into a selected one of said evaporators, a chilling element included in said inert gas circuit connected to receive unevaporated liquid refrigerant from each of said evaporators and an insulated chamber housing said chilling unit.

20. An hermetically sealed absorption refrigerating apparatus comprising an inert gas circuit including an absorber and a plurality of evaporators, a solution circuit including a generator and said absorber, means for liquefying refrigerant vapor produced in said generator, means for selectively directing the refrigerant liquid into a selected one of said evaporators, said directing means including a deformable portion of said sealed system and an operating means for said deformable portion which is positioned outside the fluid retaining walls of said refrigerating apparatus.

21. An absorption refrigerating system including a generator, a condenser connected to receive refrigerant vapor from said generator, a pair of evaporators, means for diverting liquid refrigerant discharged from said condenser into a selected evaporator, said liquid refrigerant diverting means comprising a conduit connected to receive liquid refrigerant from said condenser, spaced connections between said conduit and said evaporators, and means positioned outside the fluid retaining walls of said refrigerating system for deforming said conduit to direct the refrigerant liquid supplied thereto into a selected one of said evaporators.

22. An absorption refrigerating system including a generator, a condenser connected to receive refrigerant vapor from said generator, a pair of evaporators, means for diverting liquid refrigerant discharged from said condenser into a selected evaporator, said liquid refrigerant diverting means comprising a conduit connected to receive liquid refrigerant from said condenser, spaced connections between said conduit and said evaporators, and refrigeration demand responsive means positioned outside the fluid retaining walls of said refrigerating system for deforming said conduit to direct the refrigerant liquid supplied thereto into a selected one of said evaporators.

23. Refrigerating apparatus comprising a cabinet, a pair of evaporating elements mounted within said cabinet, a water tank mounted in heat exchange relationship with said evaporating elements, means for producing liquid refrigerant including a heat rejecting condensing element, means forming a cooling air flue with one wall of said cabinet, said heat rejecting element being mounted in said air flue, a diversion element including an elongated coiled conduit connected to said condensing element and a diversion conduit connected to said coiled conduit, means connecting said diversion conduit to said evaporating elements, the connections to individual evaporating elements being connected to said diversion conduit on opposite sides of its connection to said coiled conduit, said coil and diversion conduit being mounted in said cooling air flue, and thermostatic means operable to strain said elongated coil to tilt said diversion conduit for diverting liquid flowing therethrough selectively into one or the other of said evaporating elements, the arrangement being such that said elongated coiled conduit functions as a liquid precooling element.

24. Refrigerating apparatus comprising a solution circuit including an absorber and a generator, an inert gas circuit including an evaporator and said absorber, means for liquefying refrigerant vapor expelled from solution in said generator, said evaporator comprising means forming a passageway for inert gas, a plurality of heat conducting elements in heat transfer relationship with said passageway forming means, a container for water in heat exchange relationship with said heat conducting elements, and means arranged to convey refrigerant selectively from said liquefying means to different sections of said passageway whereby the refrigerating effect produced by the evaporation of the refrigerant into the inert gas occurs in said sections of said passageway.

25. Refrigerating apparatus comprising a solution circuit including an absorber and a generator, an inert gas circuit including an evaporator and said absorber, means for liquefying refrigerant vapor expelled from solution in said generator, said evaporator comprising means forming a passageway for inert gas, a plurality of heat conducting elements in heat transfer relationship with said passageway forming means, a container for water in heat exchange relationship with said heat conducting elements, means operable to convey refrigerant from said liquefying means to different sections of said passageway whereby the refrigerating effect produced by the evaporation of the refrigerant into the inert gas occurs only in the section of said passageway which is receiving liquid refrigerant, and ice is produced in those portions of said water container which are in heat exchange relationship with those of said heat conducting elements which are in heat exchange relationship with the section of said passageway which is receiving liquid refrigerant, and means responsive to the production of ice in said water container for operating said conveying means to convey refrigerant to a selected one of said sections.

26. An hermetically sealed refrigerating system including a cooling medium supply means, a pair of cooling units, a fluid passageway means arranged to conduct cooling medium from said supply means to said cooling units, said passageway means including a deformable part operable to direct the cooling medium into one of said cooling units when deformed in one direction and to direct the cooling medium into the other of said cooling units when deformed in another direction, and means for applying an operating force to said deformable part.

27. In a device of the character described, a source of supply of liquid, a plurality of liquid receiving sections and a liquid flow directing means connected between said source of supply of liquid and said sections, said liquid flow directing means including a deformable part operable when deformed to direct the liquid from said source to a selected one of said sections, and means positioned outside the liquid confining walls of the device for applying a deforming force to said deformable part.

DONALD G. SMELLIE.